United States Patent
Lane et al.

(10) Patent No.: US 9,721,216 B2
(45) Date of Patent: Aug. 1, 2017

(54) SOLUTION THAT AUTOMATICALLY RECOMMENDS DESIGN ASSETS WHEN MAKING ARCHITECTURAL DESIGN DECISIONS FOR INFORMATION SERVICES

(75) Inventors: Eoin Lane, Littleton, MA (US); Grant J. Larsen, Littleton, CO (US); Willie R. Patten, Hurdle Mills, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2905 days.

(21) Appl. No.: 11/944,946

(22) Filed: Nov. 26, 2007

(65) Prior Publication Data

US 2009/0138293 A1    May 28, 2009

(51) Int. Cl.
*G06Q 10/06* (2012.01)
(52) U.S. Cl.
CPC ......... *G06Q 10/06* (2013.01); *G06Q 10/0633* (2013.01)
(58) Field of Classification Search
None
See application file for complete search history.

(56) References Cited

U.S. PATENT DOCUMENTS

| | | |
|---|---|---|
| 6,256,773 B1 | 7/2001 | Bowman-Amuah |
| 6,539,396 B1 | 3/2003 | Bowman-Amuah |
| 6,658,644 B1 | 12/2003 | Bishop et al. |
| 6,799,174 B2 | 9/2004 | Chipman et al. |
| 7,080,064 B2 | 7/2006 | Sundaresan |
| 7,099,859 B2 | 8/2006 | Sundaresan |
| 7,103,871 B1 | 9/2006 | Kirkpatrick et al. |
| 7,225,241 B2 | 5/2007 | Yada |
| 7,318,055 B2 | 1/2008 | Britton et al. |
| 7,366,706 B2 | 4/2008 | Chang et al. |
| 7,412,457 B2 | 8/2008 | Saracco et al. |
| 7,483,973 B2 | 1/2009 | An et al. |
| 7,526,501 B2 | 4/2009 | Albahari et al. |

(Continued)

FOREIGN PATENT DOCUMENTS

WO    2007113164    10/2007

OTHER PUBLICATIONS

U.S. Appl. No. 12/605,660, filed Oct. 26, 2009, Coldicott et al.

(Continued)

*Primary Examiner* — Thomas L Mansfield, Jr.
(74) *Attorney, Agent, or Firm* — Cuenot, Forsythe & Kim, LLC

(57) ABSTRACT

The present invention discloses a system that provides automated guidance for making architectural decisions when designing information services in a service-oriented architecture (SOA). Such a system can include a requirements manager, a reusable asset repository, and an asset advisory tool. The requirements manager can be configured to capture non-functional requirements for information services. The reusable asset repository can be configured to store design assets. The design assets can be stored according to a unique data model that associates each design asset with a non-functional requirement. The asset advisory tool can be configured to determine a list of recommended design assets for a user-selected non-functional requirement and document the architectural decision made from the list of recommended design assets.

18 Claims, 3 Drawing Sheets

(56) References Cited

U.S. PATENT DOCUMENTS

| | | |
|---|---|---|
| 7,546,295 B2 | 6/2009 | Brave et al. |
| 1,260,565 A1 | 10/2009 | Coldicott et al. |
| 7,761,406 B2* | 7/2010 | Harken ............... 707/602 |
| 7,890,517 B2 | 2/2011 | Angelo et al. |
| 7,979,840 B2 | 7/2011 | Zhang et al. |
| 2002/0069102 A1 | 6/2002 | Vellante et al. |
| 2002/0073106 A1 | 6/2002 | Parker et al. |
| 2002/0194053 A1 | 12/2002 | Barrett et al. |
| 2003/0009740 A1 | 1/2003 | Lan |
| 2003/0233631 A1 | 12/2003 | Curry et al. |
| 2004/0172612 A1 | 9/2004 | Kasravi et al. |
| 2004/0193476 A1 | 9/2004 | Aerdts |
| 2005/0050311 A1 | 3/2005 | Joseph et al. |
| 2005/0050549 A1 | 3/2005 | Joseph et al. |
| 2005/0138113 A1 | 6/2005 | Brendle et al. |
| 2005/0166178 A1 | 7/2005 | Masticola et al. |
| 2005/0262191 A1* | 11/2005 | Mamou et al. ............... 709/203 |
| 2005/0278202 A1 | 12/2005 | Broomhall et al. |
| 2006/0015489 A1 | 1/2006 | Probst et al. |
| 2006/0047810 A1 | 3/2006 | Herzog et al. |
| 2006/0070083 A1 | 3/2006 | Brunswig et al. |
| 2006/0174222 A1 | 8/2006 | Thonse et al. |
| 2006/0229896 A1* | 10/2006 | Rosen et al. ............... 705/1 |
| 2006/0236307 A1* | 10/2006 | Debruin et al. ............... 717/117 |
| 2006/0241931 A1* | 10/2006 | Abu el Ata et al. ............... 703/27 |
| 2007/0073663 A1 | 3/2007 | McVeigh et al. |
| 2007/0112712 A1* | 5/2007 | Flinn et al. ............... 706/45 |
| 2007/0239768 A1 | 10/2007 | Quinn-Jacobs |
| 2007/0261027 A1 | 11/2007 | Dhanakshirur et al. |
| 2007/0271277 A1 | 11/2007 | Ivan et al. |
| 2008/0052314 A1* | 2/2008 | Batabyal ............... 707/104.1 |
| 2008/0059630 A1 | 3/2008 | Sattler et al. |
| 2008/0091448 A1* | 4/2008 | Niheu et al. ............... 705/1 |
| 2008/0114700 A1 | 5/2008 | Moore et al. |
| 2008/0126397 A1 | 5/2008 | Alexander et al. |
| 2008/0127047 A1 | 5/2008 | Zhang et al. |
| 2008/0133558 A1 | 6/2008 | Carlson et al. |
| 2008/0134137 A1 | 6/2008 | Petersen |
| 2008/0178147 A1 | 7/2008 | Meliksetain et al. |
| 2008/0215358 A1 | 9/2008 | Goldszmidt et al. |
| 2008/0215400 A1 | 9/2008 | Ban et al. |
| 2008/0229195 A1 | 9/2008 | Brauel et al. |
| 2008/0270372 A1 | 10/2008 | Hsu et al. |
| 2008/0288944 A1 | 11/2008 | Coqueret et al. |
| 2009/0064087 A1 | 3/2009 | Isom |
| 2009/0077043 A1 | 3/2009 | Chang et al. |
| 2009/0089078 A1 | 4/2009 | Bursey |
| 2009/0109225 A1 | 4/2009 | Srivastava et al. |
| 2009/0112908 A1 | 4/2009 | Wintel et al. |
| 2009/0132211 A1 | 5/2009 | Lane et al. |
| 2009/0138293 A1 | 5/2009 | Lane et al. |
| 2009/0158237 A1 | 6/2009 | Zhang et al. |
| 2009/0182610 A1 | 7/2009 | Palanisamy et al. |
| 2009/0182750 A1 | 7/2009 | Keyes et al. |
| 2009/0193057 A1 | 7/2009 | Maes |
| 2009/0193432 A1 | 7/2009 | McKegney et al. |
| 2009/0201917 A1 | 8/2009 | Maes et al. |
| 2009/0204467 A1 | 8/2009 | Rubio et al. |
| 2009/0210390 A1 | 8/2009 | Lane |
| 2010/0082387 A1 | 4/2010 | Cao et al. |
| 2010/0106656 A1 | 4/2010 | Sheth et al. |
| 2010/0161629 A1 | 6/2010 | Palanisamy et al. |
| 2011/0035391 A1 | 2/2011 | Werner et al. |
| 2011/0153292 A1 | 6/2011 | Lane et al. |
| 2011/0153293 A1 | 6/2011 | Coldicott et al. |
| 2011/0153608 A1 | 6/2011 | Lane et al. |
| 2011/0153610 A1 | 6/2011 | Carrato et al. |
| 2011/0153767 A1 | 6/2011 | Coldicott et al. |
| 2011/0238610 A1 | 9/2011 | Lee et al. |

OTHER PUBLICATIONS

Chen, D-W. et al.; "A P2P based Web service discovery mechanism with bounding deployment and publication", Chinese Journal of Computers; vol. 28; No. 4; pp. 615-626; Apr. 2005.

Lee, J. et al.; "Semantic and Dynamic Web Service of SOA based Smart Robots using Web 2.0 Open API", 2008; Sixth International Conference on Software Engineering, Research, Management, and Application; pp. 255-260.

Demirkan, H. et al.; "Service-oriented technology and management: Perspectives on research and practice for the coming decade"; Electronic Commerce Research and Applications vol. 7 Issue 4; Jan. 2008; pp. 356-376.

Zdun, U. et al.; "Modeling Process-Driven and Service-Oriented Architectures Using Patterns and Pattern Primitives"; ACM Transactions on the Web; vol. 1 No. 3 Article 14; Sep. 2007; 44 pages.

Simoes, B. et al.; "Enterprise-level Architecture for Interactive Web-based 3D Visualization of Geo-referenced Repositories"; Association for Computing Machinery Inc. 978-1-60558-432-4/09/0006; Jun. 2009; pp. 147-154.

Kanakalata et al; Performance Opitimization of SOA based AJAX Application; 2009; pp. 89-93.

Annett et al.; "Building Highly-Interactive, Data-Intensive, REST Applications: The Invenio Experience"; 2008; pp. 1-15.

Arnold et al.; "Automatic Realization of SOA Deployment Patterns in Distributed Environments"; ICSOC 2008; LNCS 5364; 2008; pp. 162-179.

Justin Kelleher, "A Reusable Traceability Framework Using Patterns", University of Cape Town, ACM Digital Library, 2005, pp. 50-55.

Sharples et al., "The Design and Implementation of a Mobile Learning Resource", Educational Technology Research Group, University of Birmingham, ACM Digital Library, 2002, pp. 1-23.

Min Luo, "Tutorial 1: Common Business Components and Services Toward More Agile and Flexible Industry Solutions and Assets", 2008 IEEE Congress on Services Part II, pp. 11-12.

Ying Huang et al., "A Stochastic Service Composition Model for Business Integration", Proceeds of the International Conference on Next Generation Web Services Practices, 2005 IEEE Computer Society, pp. 1-8.

Pham et al., "Analysis of Visualisation Requirements for Fuzzy Systems", 2003 ACM, pp. 181-187.

"System and Method for Distributed Web Service Adaptation using Aspect oriented Programming", IBM Technical Disclosure Bulletin, Sep. 15, 2008, pp. 1-3.

Baum et al., "Mapping Requirements to Reusable Components using Design Spaces", 2000, Proceedings 4th International Conference on Requirements Engineering, pp. 159-167.

Hsiung et al., "VERTAF: An Application Framework for the Design and Verification of Embedded Real-Time Software", IEEE Transactions on Software Engineering, vol. 30, No. 10, Oct. 2004, pp. 656-674.

Robinson et al., "Finding Reusable UML Sequence Diagrams Automatically", IEE Software, 2004, pp. 60-67.

Jin et al., "Automated Requirements Elicitation: Combining a Model-Driven Approach with Concept Reuse", International Journal of Software Engineering and Knowledge Engineering, vol. 13, No. 1, 2003, pp. 53-82.

* cited by examiner

300

| Requirements View 305 | |
|---|---|
| Requirement 310 | Details 315 |
| Performant Service | The Catalog service needs to perform within certain time limits |
| Service Traceability | An invocation of the service needs to be logged |
| Transactional | Access to the Local Inventory needs to be transactionally safe |
| Data Access | The Inventory entity is a shared business object |
| Interoperability | The Inventory service needs to be interoperable with multiple clients |
| Reusability | The Search Local Inventory service should be independent of the Inventory entity data |

Asset View 320

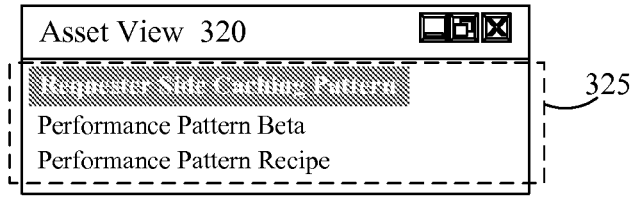

Requester Side Caching Pattern
Performance Pattern Beta
Performance Pattern Recipe

─ 325

Asset Retrieval 330

Search Results (1 Asset Found) ─ 335

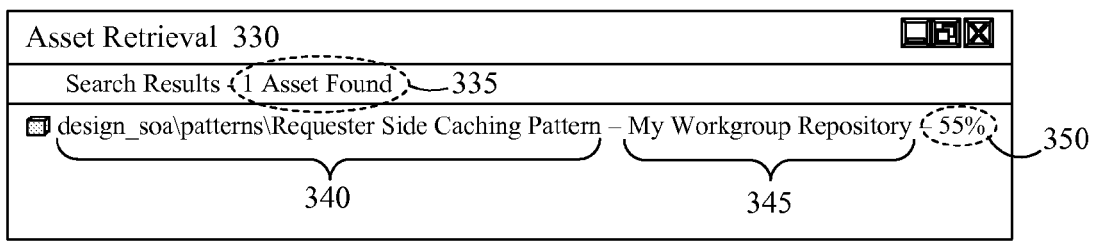

📄 design_soa\patterns\Requester Side Caching Pattern – My Workgroup Repository (55%) ─ 350

SOLUTION THAT AUTOMATICALLY RECOMMENDS DESIGN ASSETS WHEN MAKING ARCHITECTURAL DESIGN DECISIONS FOR INFORMATION SERVICES

BACKGROUND

Field of the Invention

The present invention relates to the field of information service architectural design and, more particularly, to a solution that automatically recommends design assets when making architectural design decisions for information services.

Description of the Related Art

The use of service-oriented architecture (SOA) environments and information services is fast becoming the preferred implementation for enterprise systems. A popular method for creating the architectural design models used to implement information services is the use of application patterns. An application pattern represents a repeatable solution to a problem in a particular context. For example, the preferred data source pattern is applicable when an information service requires data consistency.

As businesses expand their enterprise capabilities, more information services are added to the network to accommodate the expansion. The design and development of information services promotes the reuse of application patterns for addressing the same non-functional requirement in a similar context. However, the architects who gather non-functional requirements and make architectural decisions often do not have a comprehensive list of all the pattern assets that are available for use. Thus, the design of information services depends upon an architect's awareness of available assets to use when designing the information service.

Further, some assets require that an architect understand how to install the asset into a software application in order to use the asset. For example, a pattern implementation needs to be installed within a modeling tool, such as RATIONAL SOFTWARE ARCHITECT, in ordered to be used in design activities.

What is needed is a solution that automatically recommends design assets for architects when designing information services. That is, the solution would automatically query existing asset repositories for assets that address the non-functional requirement that a solution architect is attempting to satisfy. Ideally, such a solution would also document the architectural decisions made in order to provide usage metrics.

SUMMARY OF THE INVENTION

The present invention discloses a solution for automatically suggesting design assets when making architectural decisions for information services in a service-oriented architecture (SOA). This solution can utilize an asset advisory tool that can present a user with a list of recommended design assets for a selected non-functional requirement. The advisory tool can also present a user with a list of assets that are available for use from an asset repository. When an asset is selected for use, the advisory tool can automatically document the asset used for to satisfy the non-functional requirement in a decision log. The decision log can then be used to determine a multitude of usage metrics.

The present invention can be implemented in accordance with numerous aspects consistent with material presented herein. For example, one aspect of the present invention can include a system that provides automated guidance for making architectural decisions when designing information services in a service-oriented architecture (SOA). Such a system can include a requirements manager, a reusable asset repository, and an asset advisory tool. The requirements manager can be configured to capture non-functional requirements for information services. The reusable asset repository can be configured to store design assets. The design assets can be stored according to a unique data model that associates each design asset with a non-functional requirement. The asset advisory tool can be configured to determine a list of recommended design assets for a user-selected non-functional requirement and document the architectural decision made from the list of recommended design assets.

Another aspect of the present invention can include a method for automatically recommending design assets for information service architectural design decisions. In this method, an asset advisory tool can monitor a requirements manager for the addition of non-functional requirements. When a non-functional requirement is added, the asset advisory tool can automatically query a reusable asset repository for corresponding design assets. The advisory tool can present the results of the query as a list of recommended design assets in a user interface. The advisory tool can then receive a user-selection of a design asset from the list. The selected design asset can be retrieved from the reusable asset repository. The advisory tool can then provide access to the design asset.

Still another aspect of the present invention can include an asset advisory tool. The asset advisory tool can include a user interface and a decision log. The user interface can be configured to accept and execute user-selected actions. The decision log can be configured to store data that describes the context of an architectural decision.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

FIG. 3 is a collection of graphical user interfaces (GUIs) illustrating the displays of an asset advisory tool in accordance with an embodiment of the inventive arrangements disclosed herein.

DETAILED DESCRIPTION OF THE INVENTION

Figure 1:
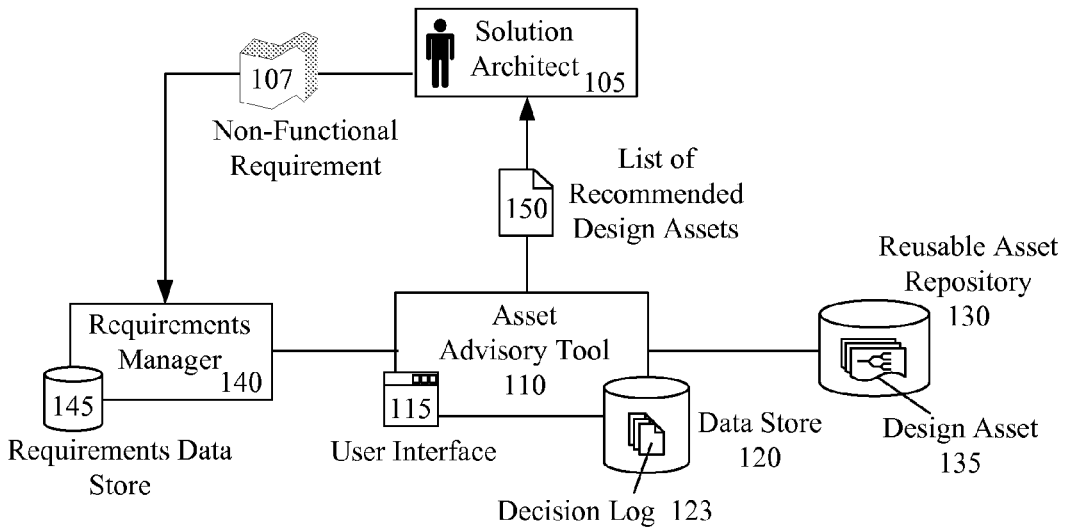
FIG. 1 is a schematic diagram of a system for automatically recommending design assets when designing information services in accordance with embodiments of the inventive arrangements disclosed herein.

FIG. 1 is a schematic diagram of a system 100 for automatically recommending design assets when designing information services in accordance with embodiments of the inventive arrangements disclosed herein. In system 100, a solution architect 105 can input a non-functional requirement 107 for an information service into a requirements manager 140 and receive a list of recommended design assets 150 from an asset advisory tool 110, herein referred to as the advisory tool.

The requirements manager 140 can be a software application designed to capture and store design requirements. Non-functional requirements 107 can be stored in a requirements data store 145. The requirements manager 140 can be a commercially-available system, such as RATIONAL REQUISITE PRO, that can be implemented independently of the advisory tool 110.

The advisory tool 110 can be a software application that can monitor the activities and/or contents of the requirements manager 140 in order to produce a list of recommended design assets 150 when a non-functional requirement 107 is input. In order to generate the list of recommended design assets 150, the advisory tool 110 can query a reusable asset repository 130 to determine which design assets 135 pertain to the non-functional requirement 107. In an alternate embodiment, the advisory tool 110 can monitor multiple requirements managers 140 and access multiple reusable asset repositories 130.

The reusable asset repository 130 can be a data store configured to contain a multitude of design assets 135. Design assets 135 can encompass a variety of items, including, but not limited to, pattern recipes, pattern specifications, pattern implementations, data models, design manuals, and the like.

The design assets 135 can be stored within the reusable asset repository 130 using a unique data model containing fields that relate the design asset 135 with a particular non-functional requirement 107, software application (not shown), and/or software application version. For example, the preferred data source pattern asset 135 can be stored with a data attribute associating it with a consistency non-functional requirement 107.

Further, multiple instances of a design asset 135 can exist in the repository 130 where each instance corresponds to a different software application. For example, two pattern implementations can exist for the preferred data source pattern—one meant for use with RATIONAL SOFTWARE ARCHITECT version 7.0 and the other for use with WEBSPHERE BUSINESS MODELER.

The advisory tool 110 can include a user interface 115 and a data store 120 containing decision logs 123. The advisory tool 110 can be implemented as a plug-in component that utilizes communication standards that support cross-platform interoperability and/or as a light-weight Web application. For example, the advisory tool 110 can be written as an ECLIPSE environment plug-in that utilizes an extensible markup language (XML) schema, which can then interface with other software applications that utilize the ECLIPSE environment as well as applications that support XML transactions.

The user interface 115 can be the means by which the advisory tool 110 interacts with the solution architect 105. The user interface 115 can display the list of recommended design assets 150 to the solution architect 105 as well as receive input from the architect 105.

The decision logs 123 can be the means by which the advisory tool 110 can automatically document architectural design decisions. A decision log 123 can include information pertaining to the non-functional requirement 107 being addressed and the design assets 135 used to satisfy the requirement 107. In another embodiment, the decision log 123 can be stored in a remotely-located data store (not shown).

It should be noted that the automatic documentation of requirements 107 satisfaction with specific design assets 135 is a feature currently unavailable in conventional software tools used in the design of information services in a service-oriented architecture (SOA). By capturing the design assets 135 used to satisfy non-functional requirements 107 automatically and electronically, the data of the decision log 123 can be processed to determine a variety of valuable information, such as decision consistency, usage metrics, and unsatisfied requirements.

Additionally, when a solution architect 105 selects a design asset 135 for use from the list of recommended design assets 150, the advisory tool 110 can retrieve the selected design asset 135 from the reusable asset repository 130 and make the design asset 135 available to the solution architect 105. The advisory tool 100 can make the selected design asset 135 available to the solution architect 105 in a variety of ways, depending on the type of design asset 135, how the design asset 135 is stored, and the applications available to the solution architect 105.

For example, if the solution architect 105 chooses to use the preferred data source pattern 135 to address the non-functional requirement 107, then the advisory tool 110 can correlate the software applications available to the solution architect 105 with the software applications necessary to utilize the preferred data source pattern assets 135 in the repository 130.

The advisory tool 110 can then use this correlation to generate a relevance weighting for each asset 135 to include in the display of preferred data source pattern assets 135. This can allow the solution architect 105 to make a more informed asset 135 selection. Further, in cases where a selected design asset 135 requires an installation to be usable by a software application, the advisory tool 110 can automatically initiate the installation for the solution architect 105, thereby providing seamless access to the asset 135.

It should be noted that the components 110, 130, and 140 of system 100 can be communicatively linked via one or more secure and/or unsecured networks (not shown). Such networks (not shown) can include any hardware/software/ and firmware necessary to convey data encoded within carrier waves. Data can be contained within analog or digital signals and conveyed though data or voice channels. These networks (not shown) can include local components and data pathways necessary for communications to be exchanged among computing device components and between integrated device components and peripheral devices. Additionally, these networks (not shown) can also include network equipment, such as routers, data lines, hubs, and intermediary servers which together form a data network, such as the Internet. Further, such networks (not shown) can also include circuit-based communication components and mobile communication components, such as telephony switches, modems, cellular communication towers, and the like. The networks (not shown) can include line based and/or wireless communication pathways.

As used herein, presented data stores, including stores 120, 130, and 145 can be a physical or virtual storage space configured to store digital information. Data stores 120, 130, and 145 can be physically implemented within any type of hardware including, but not limited to, a magnetic disk, an optical disk, a semiconductor memory, a digitally encoded plastic memory, a holographic memory, or any other recording medium. Data stores 120, 130, and 145 can be a stand-alone storage unit as well as a storage unit formed from a plurality of physical devices. Additionally, information can be stored within data stores 120, 130, and 145 in a variety of manners. For example, information can be stored within a database structure or can be stored within one or more files of a file storage system, where each file may or may not be indexed for information searching purposes. Further, data stores 120, 130, and/or 145 can utilize one or more encryption mechanisms to protect stored information from unauthorized access.

Figure 2:
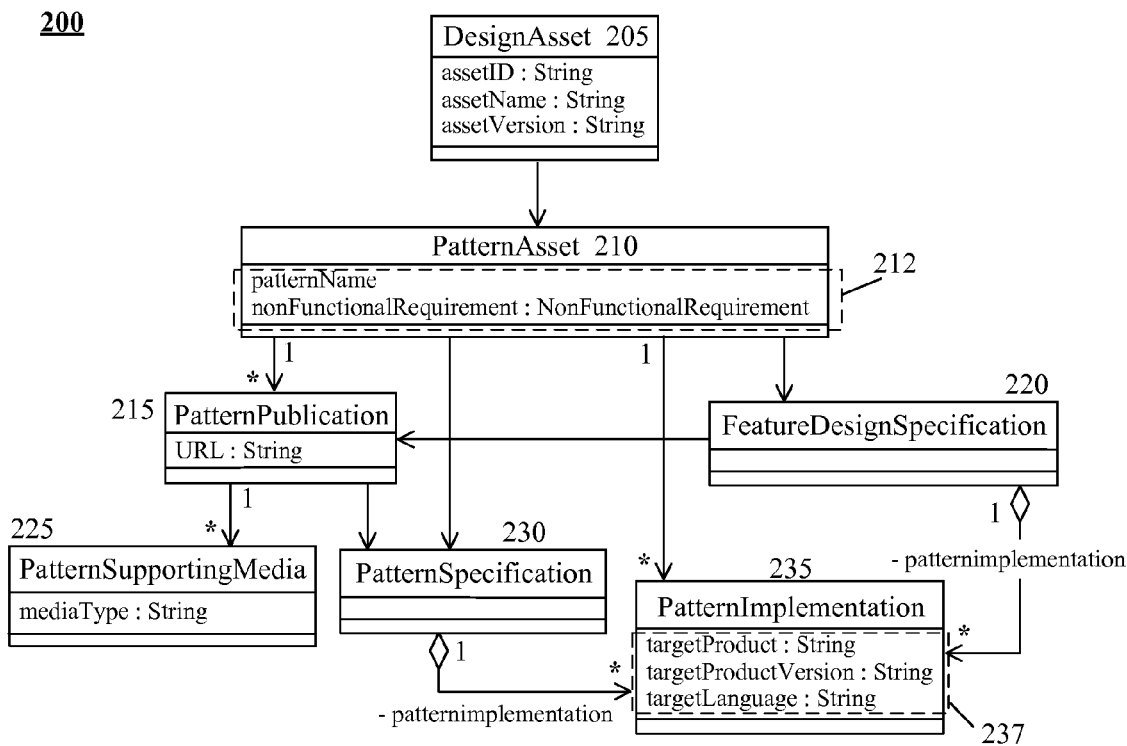
FIG. 2 is an example of a data model for cataloging design assets in a reusable asset repository that associates the design asset with a non-functional requirement of an information service in accordance with an embodiment of the inventive arrangements disclosed herein.

FIG. 2 is an example of a data model 200 for cataloging design assets 205 in a reusable asset repository that associates the design asset 205 with a non-functional requirement of an information service in accordance with an embodiment of the inventive arrangements disclosed herein. The sample data model 200 can be a used by the asset advisory tool 110 of system 100 in order to determine the applicability of a design asset 135 to the non-functional requirement 107. It should be noted that this data model 200 is for illustrative purposes only and is not meant as an absolute representation of an implementation.

The data model 200 can be written in a formal modeling language, such as the Unified Modeling Language (UML) class diagram used in this example. The data model 200 can consist of seven classes: DesignAsset 205, PatternAsset 210, PatternPublication 215, FeatureDesignSpecification 220, PatternSupportingMedia 225, PatternSpecification 230, and PatternImplementation 235.

The DesignAsset class 205 can be the root class and can encompass different types of design assets. This example data model 200 focuses on pattern assets, as shown by the PatternAsset class 210.

The classes 205, 210, 215, 220, 225, 230, and 235, in following with the standard format of UML class diagrams, can each include a set of data attributes and/or methods. Of particular note is the attribute set 212 belonging to the PatternAsset class 210. As shown in this example, the set of attributes 212 can include a patternName and nonFunctionalRequirement. Through the use of these attributes 212, a PatternAsset 210 can be related to a specific non-functional requirement.

Because these attributes 212 are contained in a class 210 that is relatively high in the data model 200 hierarchy, the time necessary to query this data based on a pattern name or non-functional requirement, such as those that would be performed by an advisory tool, can be decreased. That is, the advisory tool would not need to traverse far into the data model 200 in order to find these attributes 212.

Data model 200 can be read as follows. A DesignAsset 205 can be a PatternAsset 210. A PatternAsset 210 can include many PatternPublications 215, a PatternSpecification 230, a FeatureDesignSpecification 220, and/or multiple PatternImplementations 235.

A PatternPublication 215 can have many PatternSupportingMedia 225 and/or a PatternSpecification 230. For example, a design manual can be available as a WORD document, a PDF document, and a FLASH document.

A FeatureDesignSpecification 220 can include a PatternPublication 215 and can have multiple PatternImplementations 235. A PatternSpecification 230 can also have multiple PatternImplementations 235.

The PatternImplementation 235 can include attributes 237 that indicate the name of the software application and/or the version of the software application that can be used to access the PatternImplementation 235. This structure can allow multiple PatternImplementations 235 to exist within the repository for various applications and/or application versions.

FIG. 3 is a collection 300 of graphical user interfaces (GUIs) 305, 325, and 330 illustrating the displays of an asset advisory tool in accordance with an embodiment of the inventive arrangements disclosed herein. The interfaces of collection 300 can be used by the advisory tool 110 of system 100 as well as data stored according to the data model 200 of FIG. 2.

In this example, collection 300 can include interfaces presenting a requirements view 305, an asset view 320, and an asset retrieval 330. The requirements view 305 can present a solution architect with a list of non-functional requirements 310 and associated details 315. The non-functional requirements 310 and details 315 presented in the requirements view 305 can be obtained from a requirements repository, such as the requirements manager 140 of system 100.

From the requirements view 305, a solution architect can select a non-functional requirement 310 of interest or that pertains to the particular information service being designed.

The asset view 320 can present a listing of assets 325 that pertain to the specific non-functional requirement, such as the list of recommended design assets 150 of system 100. Further, the asset view 320 can be presented as the result of a user-selection of a non-functional requirement 310 from the requirements view 305.

The assets 325 listed in the asset view 320 can be the results of querying one or more reusable asset repositories that contain the listed design assets 325. The information displayed in the asset list 325 can correspond to the patternName attribute of the PatternAsset class 210 of the example data model 200. A solution architect can select a listed asset 325 to use to satisfy the non-functional requirement.

The selection of an asset 325 in the asset view 320 can result in the display of the asset retrieval interface 330. The asset retrieval interface 330 can display the specific asset items available for use for the asset selected from the asset view 320. Information displayed in the asset retrieval interface 330 can include the quantity of assets retrieved 335, the file path 340 of the asset, the name of the reusable asset repository 345 where the asset can be found, and a relevance weighting 350.

The quantity of assets retrieved 335 can identify the total number of matching assets found in reusable asset repositories. It should be noted that this quantity 335 can include multiple instances of the same asset that are for different modeling tools or in different formats.

The file path 340 can identify the file system location of a specific asset. The repository name 345 can indicate the specific reusable asset repository where the asset can be found.

The relevance weighting 350 can represent the degree to which the asset is usable to the solution architect. The advisory tool can calculate the relevance weighting 350 using an algorithm and values for a variety of factors that influence usability. For example, the relevance weighting 350 of an asset can be significantly decreased if the solution architect does not have access to the application necessary to use the asset.

Figure 4:
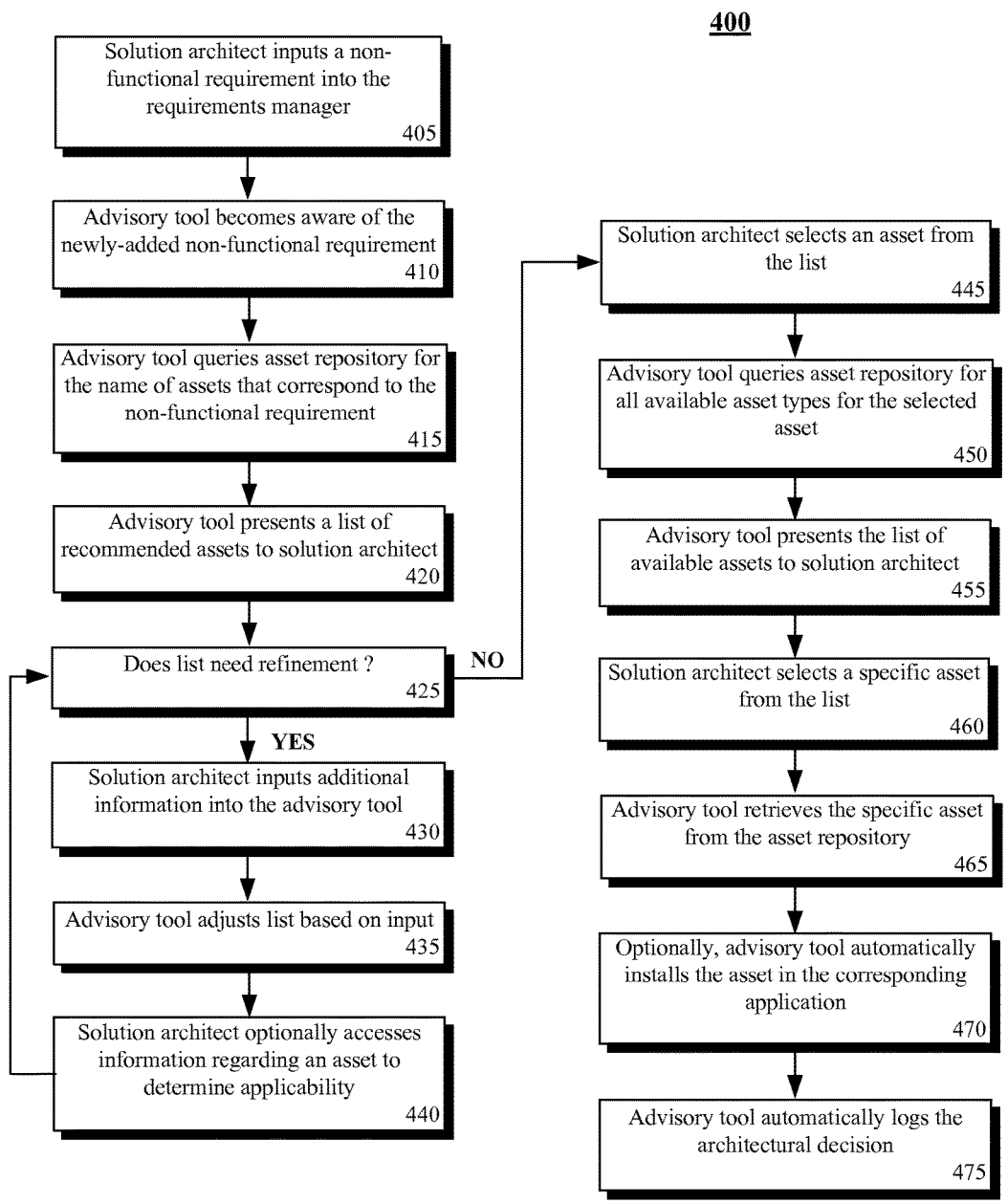
FIG. 4 is a flow chart of a method for using an asset advisory tool that automatically recommends design assets for architectural decisions in accordance with an embodiment of the inventive arrangements disclosed herein.

FIG. 4 is a flow chart of a method 400 for using an asset advisory tool that automatically recommends design assets for architectural decisions in accordance with an embodiment of the inventive arrangements disclosed herein. Method 400 can be performed within the context of system 100 and/or using the sample data model 200 of FIG. 2 and/or utilizing the interfaces of collection 300.

Method 400 can begin with step 405 where a solution architect inputs a non-functional requirement into a requirements manager. An advisory tool can become aware of the added non-functional requirement in step 410.

In step 415, the advisory tool can query an asset repository for assets that correspond to the non-functional requirement. The advisory tool can present a list of recommended assets to the solution architect in step 420. The list presented in step 420 can consist of the names or titles of assets that can be used to satisfy the non-functional requirement.

In step 425, the solution architect can determine if the presented list of recommended assets requires refinement. When the solution architect decides to refine the list of recommended assets, flow can proceed to step 430 where the solution architect can input additional information into the advisory tool as the basis of refinement.

In step 435, the advisory tool can adjust the list of recommended assets based on the input of step 430. The solution architect can optionally access information related to a listed asset in order to determine the asset's applicability in step 440.

After the execution of step 440, flow returns to step 425 where the solution architect can reassess the state of the adjusted list of recommended assets. Method 400 can continue to repeat steps 425 through 440 until the solution architect no longer wishes to refine the list of recommended assets.

When the refinement of the list of recommended assets is no longer necessary, flow can proceed to step 445 where the solution architect can select an asset from the list. In step 450, the advisory tool can query the asset repository for all available asset types that correspond to the selected asset. For example, a selection of the preferred data source pattern can return a list containing a pattern implementation and a pattern specification.

This list of available assets can be presented to the solution architect in step 455. In step 460, the solution architect can select a specific asset from the list presented in step 455. The advisory tool can retrieve the selected asset from the asset repository in step 465.

Optionally, the advisory tool can automatically install the retrieved asset into its corresponding application in step 470. In step 475, the advisory tool can automatically log the architectural decision that was made by the solution architect.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system that provides automated guidance for architectural decisions for information services in a service-oriented architecture (SOA) comprising:
   at least one computer program product, comprising at least one computer-readable, tangible storage device having a non-transitory computer readable program code stored therein, said computer-readable program code containing instructions that are carried out by at least one processor of at least one computer system to implement a set of functions for which the computer-readable program code is configured to handle, said at least one computer program product comprising a requirements manager and an asset advisory tool;
   the requirements manager configured to catalog a plurality of non-functional requirements for a plurality of information services implemented in a service-oriented architecture (SOA) environment;
   a reusable asset repository, which is a non-transitory storage medium, configured to store a plurality of design assets, wherein each design asset is stored according to a unique data model, wherein said unique data model identifies each asset with a nonfunctional requirement, wherein said unique data model identifies each asset with a nonfunctional requirement, wherein the unique data model includes data that identifies an application for use with each design asset, wherein said data includes an application name and an application version, wherein the asset advisory tool automatically selects and installs the user-selected design asset in an available design tool that corresponds to the application identified for the design asset; and
   the asset advisory tool configured to determine a list of recommended design assets for a user-selected non-functional requirement, wherein the user-selected non-functional requirement is contained within the requirements manager, and wherein each design asset in the list of recommended design assets is available in the reusable asset repository and documents a user-selection of at least one design asset from the list of recommended design assets, wherein the user-selection of the at least one design asset signifies a satisfaction of the user-selected non-functional requirement in a design of an architecture for an information service.

2. The system of claim 1, wherein the asset advisory tool further comprises: a user interface configured to accept user-selections of non-functional requirements and execute actions corresponding to the user-selections, wherein said actions includes a generation of the list of recommended design assets and a presentation of the list of recommended design assets;

and a decision log configured to store data describing a context of an architectural decision, wherein the context includes the user-selection of the one or more design assets from the list of recommended design assets and the user-selected non-functional requirement.

3. The system of claim 2, wherein the data of the decision log is processed by a metrics application, wherein the metrics application identifies asset usage in relation to non-functional requirements and decision consistency.

4. The system of claim 1, wherein the plurality of design assets includes at least one of a pattern specification, a pattern implementation, a pattern recipe, and a design manual.

5. The system of claim 1, wherein the asset advisory tool is written as a plug-in software component for a Rich Client Platform (RCP), wherein the asset advisory tool represents an extended capability for another software application that utilizes the RCP.

6. The system of claim 5, wherein the RCP is an Eclipse environment, whereby the asset advisory tool extends the capabilities of a development solution.

7. The system of claim 1, wherein the asset advisory tool is implemented as a Web application, wherein said Web implementation is configured to perform a subset of functions designed for Web communications.

8. The system of claim 1, wherein the list of recommended design assets includes a relevance factor for each design asset listed, wherein the relevance factor indicates a degree of applicability for the design asset in relation to the user-selected nonfunctional requirement.

9. A method for automatically recommending design assets for information service architectural design decisions comprising:

an asset advisory tool monitoring, via computer equipment executing computer readable program code stored in hardware, a requirements manager for an addition of a non-functional requirement for an information service;

upon the addition of the non-functional requirement, the asset advisory tool automatically querying, via computer equipment executing computer readable program code stored in hardware, a reusable asset repository for at least one design asset that corresponds to the non-functional requirement, wherein said unique data model identifies each asset with a nonfunctional requirement, wherein the unique data model includes data that identifies an application for use with each design asset, wherein said data includes an application name and an application version, wherein the asset advisory tool automatically selects and installs the user-selected design asset in an available design tool that corresponds to the application identified for the design asset;

presenting, via computer equipment executing computer readable program code stored in hardware, at least one applicable design asset as a list of recommended design assets in a display of a user interface;

receiving, via computer equipment executing computer readable program code stored in hardware, a user-selection of at least one of the design assets contained in the list of recommended design assets;

retrieving, via computer equipment executing computer readable program code stored in hardware, at least one user-selected design assets from the reusable asset repository; and providing, via computer equipment executing computer readable program code stored in hardware, access to at least one user-selected design asset.

10. The method of claim 9, further comprising: documenting an architectural decision, wherein the architectural decision includes the non-functional requirement and at least one of the user-selected design assets.

11. The method of claim 9, wherein the querying step utilizes a context map to determine which design assets are applicable to the non-functional requirement.

12. The method of claim 9, wherein the providing step further comprises: optionally and when available, installing the design asset in a corresponding design tool, wherein the design asset is usable for design activities.

13. The method of claim 9, wherein the at least one design asset in the reusable asset repository is stored according to a unique data model, wherein said unique data model is captures a relationship between the design asset and the non-functional requirement it satisfies.

14. The method of claim 9, wherein the presenting step further comprises:

accepting, via computer equipment executing computer readable program code stored in hardware, a user-input of a criterion, wherein the criterion describes an attribute of the information service by which to refine the list of recommended design assets; and adjusting, via computer equipment executing computer readable program code stored in hardware, the list of recommended design assets in accordance with the criterion.

15. The method of claim 9, wherein said steps of claim 9 are performed by at least one machine in accordance with at least one computer program stored in a computer readable media, said computer program having a plurality of code sections that are executable by the at least one machine.

16. An asset advisory tool comprising:

at least one computer program product, comprising at least one computer-readable, tangible storage device having a non-transitory computer readable program code stored therein, said computer-readable program code containing instructions that are carried out by at least one processor of at least one computer system to implement a set of functions for which the computer-readable program is configured to handle, said at least one computer program product defining an interface and a decision log;

said interface configured to accept user-selections of non-functional requirements and execute actions corresponding to the user-selections, wherein said actions includes a generation of a list of recommended design assets and a presentation of the list of recommended design assets, wherein said unique data model identifies each asset with a nonfunctional requirement, wherein the unique data model includes data that identifies an application for use with each design asset, wherein said data includes an application name and an application version, wherein the asset advisory tool automatically selects and installs the user-selected design asset in an available design tool that corresponds to the application identified for the design asset; and said decision log configured to store data describing a context of an architectural decision, wherein the context includes a user-selection of at least one design asset from the list of recommended design assets and a corresponding non-functional requirement.

17. The advisory tool of claim 16, wherein the elements of claim 16 constitute an asset advisory tool, wherein said advisory tool exists as a plug-in software component for a Rich Client Platform (RCP), wherein the asset advisory tool represents an extended capability for another software application that utilizes the RCP.

18. The advisory tool of claim 16, wherein the decision log is processed by a metrics application, wherein the metrics application identifies asset usage in relation to non-functional requirements and decision consistency.

* * * * *